United States Patent [19]

Diebner

[11] 3,860,594

[45] Jan. 14, 1975

[54] PREPARATION OF AMMELIDES

[75] Inventor: Robert L. Diebner, Lake Jackson, Tex.

[73] Assignee: The Dow Chemical Company, Midland, Mich.

[22] Filed: Dec. 29, 1972

[21] Appl. No.: 319,184

[52] U.S. Cl. .......................................... 260/249.5
[51] Int. Cl............................................. C07d 55/18
[58] Field of Search ................................ 260/249.5

[56] References Cited
OTHER PUBLICATIONS

Karrer, Organic Chemistry, 2nd Ed., Elsevier Pub. Co., N.Y. (1946) QD251K52.

Primary Examiner—John M. Ford
Attorney, Agent, or Firm—Benjamin G. Colley

[57] ABSTRACT

Process for the preparation of ammelides from guanidine, hydrocarbon substituted guanidines or acid salts thereof in which the guanidine compounds are heated with biuret in an inert organic solvent in the presence of a basic catalyst.

5 Claims, No Drawings

PREPARATION OF AMMELIDES

BACKGROUND OF THE INVENTION

This invention relates to a process for the preparation of ammelides by the reaction of biuret with guanidine compounds. More specifically, the process involves the reaction of biuret with guanidine, hydrocarbon substituted derivatives thereof, and salts thereof in the presence of a basic catalyst in an inert organic solvent.

Ammelide is reviewed in Vol. 13 of the Chemistry of Heterocyclic Compounds by A. Weissberger, pages 269–274 (1959). It is known from U.S. Pat. No. 2,476,452 that ammelide can be prepared by the reaction of dicyandiamide with $CO_2$ in a solvent in a pressure range from 200 to 600 p.s.i. A serious economic disadvantage of this process is that high pressures must be used.

It is also known from U.S. Pat. No. 2,572,587 to decompose urea at temperatures of 225°C. – 350°C. and pressures of 10 to 610 atmospheres to produce a mixture of ammelide and ammeline. Again the high pressures used and the fact that a mixture of products is obtained makes this process economically unattractive.

Kaiser, et al. in J. Org. Chem. 17:185 (1952) mention the preparation of ammelide from the reaction of carbethoxyguanylurea with NaOH or $NH_4OH$, but this appears to be a tedious multistep laboratory procedure (i.e., including preparation of the precursors) not suited to commercial operations.

In contrast to the prior art, the present process achieves good yields of ammelides at atmospheric pressure using inexpensive reactants.

SUMMARY OF THE INVENTION

The present invention relates to a process for the preparation of ammelides by heating a mixture of biuret with guanidine compounds in an inert organic solvent in the presence of a basic catalyst to a temperature greater than 120°C. and with an inert gas purge to remove ammonia gas.

While it is preferred to use guanidine or its acid salts, the process is applicable to hydrocarbon substituted guanidines and their acid salts.

The ammelides produced by this process are useful as thickeners for lubricating greases.

DETAILED DESCRIPTION OF THE INVENTION

The present invention relates to a process for the preparation of ammelides which comprises the steps of
A. heating a mixture of biuret and a guanidine compound selected from guanidine, hydrocarbon substituted derivatives thereof, and acid salts thereof, dissolved in an inert organic solvent to a temperature greater than 120°C. until the reaction is complete in the presence of an effective amount of a basic catalyst,
B. removing ammonia gas as it is evolved, and
C. recovering ammelides.

While it is preferred to use a mol ratio of guanidine compound to biuret of 1:1, the reaction can be conducted over the mole range from 0.5:1 to 2.0:1 guanidine to biuret.

The temperature of the reaction should be greater than 120°C. and preferably in the range of 125° to 200°C. The reaction time is not critical and can vary from about 4 hours to 12 hours.

The reaction is carried out at essentially atmospheric pressure. Higher pressures are detrimental to the product yield. Lower pressures are not useful since the reaction must be purged with an inert gas.

The guanidine compounds useful in this process are guanidine itself, hydrocarbon derivatives thereof and acid salts thereof. Examples of the useful derivatives are illustrated by 1,3-diphenyl guanidine, 1,3-ditolyl guanidine, 1-methyl guanidine, 1-butyl guanidine, 1-hexyl guanidine, 1-phenyl, 3-tolyl guanidine, 1,1,3-triphenyl guanidine, 1,2,3-triphenyl guanidine, and the like. The acid salts of the foregoing are also useful. Examples of the acid salts are the acetates, carbonates, hydrochlorides, citrates, picrates, sulfates, etc. These guanidines are commercially available, well known, or can be readily prepared by known procedures.

The foregoing guanidines are mixed with the proper amount of biuret and heated in an inert organic solvent. Examples of the organic solvents used herein are dimethylformamide, glycols, monoalkyl ethers of glycols and cyclic polyglycol ethers.

The glycols used herein are illustrated by ethylene glycol, diethylene glycol, dipropylene glycol, ethylene glycol ethyl ether, ethylene glycol methyl ether, ethylene glycol n-butyl ether, diethylene glycol ethyl ether, diethylene glycol methyl ether, diethylene glycol n-butyl ether, and the like.

The cyclic polyglycol ethers used herein as solvents are the cyclic trimer, tetramer, pentamer and hexamer of ethylene oxide.

It is essential for achieving good yields that the process be conducted in the presence of an effective amount of a basic catalyst. An effective amount is defined as from about 0.05 mole to 0.2 mole of catalyst per mole of biuret.

Examples of the basic catalysts that can be used are alkali metal carbonates, hydroxides, and cyanates and alkoxides.

During the course of the reaction ammonia gas is evolved. This can be removed from the reaction zone by using a constant inert gas purge in the reaction vessel. Examples of suitable gases are nitrogen, argon, methane, ethane, and propane or mixtures thereof.

After the reaction is completed the reaction mixture is allowed to cool and the precipitated ammelides are filtered out. The remainder of the solvent on the filter residue is removed by heating in a vacuum oven. This residue was then slurried in water (hot or cold) and again filtered. The filter residue from this second filtration was dried in a vacuum oven in approximate range of 1–5 mm Hg and 100° – 130°C. to give the final purified ammelide.

The invention is further illustrated by the following non-limiting examples.

EXAMPLE I

Into a resin flask equipped with a stirrer, thermocouple, condenser and nitrogen purge tube was poured 45.0 gms. of guanidine hydrochloride (0.47 mole), 69.2 gms. biuret (0.67 mole) 3.35 gms. sodium cyanate (0.051 mole) and 180 gms. ethylene glycol monobutyl ether.

The materials were mixed, using the stirrer, and heated to 170°–175°C. for 4.5 hours with a continuous nitrogen purge through the flask.

The reaction mixture was then allowed to cool to room temperature and the solvent was filtered off from the solids. The filter residue was heated to approximately 120°C. in a vacuum oven operating under about 1 – 5 mm. of Hg.

The residue was then slurried in hot water (80°C.) and filtered hot. The resultant filter residue was heated to approximately 120°C. in a vacuum oven at about 1–5 mm. of Hg and 25.3 gms. of high purity ammelide was obtained. This represents a 42.0 percent yield.

EXAMPLE II

The procedures of Example I were repeated using molar amounts of 1,3-diphenyl guanidine and biuret. The filter residue from the reaction was slurried in acetone and dried in a dry box. The final product was identified by infrared analysis as a diphenyl substituted ammelide.

By following the above examples using equivalent amounts of the other aformentioned alkyl and aryl substituted guanidines, hydrocarbon substituted ammelides are obtained in the same manner.

I claim:

1. A process for the preparation of ammelides which comprises the steps of
    A. heating a mixture of biuret and a guanidine compound selected from guanidine, 1,3-diphenyl guanidine, 1,3-ditolyl guanidine, 1-methyl guanidine, 1-butyl guanidine, 1-hexyl guanidine, 1-phenyl-3-tolyl guanidine, 1,1,3-triphenyl guanidine, 1,2,3-triphenyl guanidine, and acid salts thereof, dissolved in an inert organic solvent to a temperature greater than 120°C. until the reaction is complete in the presence of an effective amount of a basic catalyst,
    B. removing ammonia gas as it is evolved, and
    C. recovering ammelides.

2. The process as set forth in claim 1 wherein the mol ratio of guanidine compound to biuret is in the range of 0.5:1 to 2.0:1.

3. The process as set forth in claim 1 wherein the temperature used is from about 125°C. to about 200°C.

4. The process as set forth in claim 1 wherein the guanidine compound is guanidine hydrochloride.

5. The process as set forth in claim 1 where the organic solvent is selected from dimethylformamide, glycols, monoalkyl ethers of glycols, and cyclic polyglycol ethers.

* * * * *